United States Patent
Gupta et al.

(10) Patent No.: US 8,994,202 B2
(45) Date of Patent: Mar. 31, 2015

(54) METHOD AND SYSTEM FOR OPERATING A WIND TURBINE DURING AN OVERVOLTAGE EVENT

(75) Inventors: Amit Kumar Gupta, Singapore (SG); Anshuman Tripathi, Singapore (SG); Ove Styhm, Hadsten (DK); Lars Helle, Suldrup (DK); Yugarajan Karuppanan, Singapore (SG); Gil Lampong Opina, Jr., Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 55 days.

(21) Appl. No.: 13/992,650

(22) PCT Filed: Dec. 7, 2011

(86) PCT No.: PCT/DK2011/050465
§ 371 (c)(1),
(2), (4) Date: Sep. 20, 2013

(87) PCT Pub. No.: WO2012/076015
PCT Pub. Date: Jun. 14, 2012

(65) Prior Publication Data
US 2014/0001759 A1    Jan. 2, 2014

Related U.S. Application Data

(60) Provisional application No. 61/421,649, filed on Dec. 10, 2010.

(30) Foreign Application Priority Data

Dec. 10, 2010    (DK) ................................ 2010 70538

(51) Int. Cl.
*H02P 9/00*     (2006.01)
*F03D 9/00*     (2006.01)
*H02J 3/38*     (2006.01)

(52) U.S. Cl.
CPC ................. *F03D 9/003* (2013.01); *H02J 3/386* (2013.01); *Y02E 10/72* (2013.01); *Y02E 10/763* (2013.01)

USPC .......................................................... 290/44

(58) Field of Classification Search
USPC .......................................................... 290/44
See application file for complete search history.

(56) References Cited

U.S. PATENT DOCUMENTS

| | | | | |
|---|---|---|---|---|
| 7,164,562 B2 * | 1/2007 | Virtanen | .......................... | 361/20 |
| 7,276,807 B2 * | 10/2007 | Luetze et al. | .................... | 290/44 |
| 7,332,827 B2 * | 2/2008 | Nielsen | ............................ | 290/55 |

(Continued)

FOREIGN PATENT DOCUMENTS

| | | | | |
|---|---|---|---|---|
| DE | 10105892 A1 * | 9/2002 | ................ | H02P 9/00 |
| EP | 1863162 A2 * | 12/2007 | ................ | H02P 3/22 |

(Continued)

OTHER PUBLICATIONS

International Search Report, PCT/DK2011/050465, May 29, 2012.
Search Report and Written Opinion, Danish Application No. PA 2010 70538, Jun. 10, 2011.

*Primary Examiner* — Joseph Waks
(74) *Attorney, Agent, or Firm* — Patterson + Sheridan, LLP

(57) ABSTRACT

A method of operating a wind turbine is disclosed, the wind turbine comprising a power generator, a machine-side converter connected to the power generator, a line-side converter connected to a power grid through associated power components, and a DC-link connected between the machine-side converter and the line-side converter. The method includes monitoring the power grid for overvoltage events, and upon detecting an overvoltage event: (1) disabling active operation of the machine-side converter and the line-side converter, (2) enabling an AC load dump connected between the machine side converter and the power generator in order to dissipate power output from the power generator, (3) waiting for a waiting period, and (4) enabling active operation of the line-side converter and the machine converter when the overvoltage event ends within the waiting period.

20 Claims, 10 Drawing Sheets

(56) References Cited

U.S. PATENT DOCUMENTS

| | | |
|---|---|---|
| 7,423,412 B2 | 9/2008 | Weng |
| 8,093,742 B2 * | 1/2012 | Gupta et al. ............ 290/44 |
| 2004/0222642 A1 * | 11/2004 | Siebenthaler et al. ...... 290/44 |
| 2010/0134935 A1 | 6/2010 | Ritter |
| 2012/0217824 A1 * | 8/2012 | Gupta et al. ............ 307/145 |

FOREIGN PATENT DOCUMENTS

| | | |
|---|---|---|
| EP | 1909371 A2 | 4/2009 |
| WO | WO2008131799 A1 | 11/2008 |

* cited by examiner

METHOD AND SYSTEM FOR OPERATING A WIND TURBINE DURING AN OVERVOLTAGE EVENT

BACKGROUND

The present invention relates to a method of operating a wind turbine. Further, the present invention relates to a system of controlling operation of a wind turbine. Finally, the present invention relates to a wind turbine.

In recent years, it has become an important aspect of grid codes to properly handle overvoltage occurring on power grids to which the wind turbines are connected. That is, wind turbines should be capable of staying connected to the power grids or ride through even in the case of overvoltage. Wind turbines being capable of staying connected to the power grids during overvoltage may be called overvoltage/high voltage ride through capable wind turbines.

Overvoltages (OV) are gaining attention from wind farm owners and wind turbine manufacturers due to the large amount of sensitive power electronics in wind turbines with frequency converters. The transmission system operators are also interested in this phenomenon, since situations in the grid connection system of offshore wind farms have occurred where the insulation systems have been stressed in situations never experienced before. Overvoltages as high as 2 p.u. have been observed. In these events, the main-circuit breaker tripped the wind farm cable at the on-land connection point and left the wind farm in isolated operation with the cable and the wind farm transformer. Although such events are rare, this represents a risk of damaging the equipment. The Danish transmission system operator thus performed investigations of such OV in connection with the planning of new offshore wind farms. These investigations have shown that the OV levels are influenced by many parameters, including operational characteristics of the Wind Turbine Generators (WTG) prior to the disconnection, protection systems, control and the accuracy of the representation of the cable and the transformers in the relevant frequency range.

According to the grid code studies, a voltage up to 2.0 times the nominal grid voltage can be applied at the WTG terminals. For example, in Australia, the temporary OV can be up to 1.6 pu and in Canada-Manitoba the temporary OV can be up to 2.0 pu.

In W. Sweet, "Danish Wind Turbines Take Unfortunate Turn", IEEE Spectrum, vol. 41, no. 11, pp. 30, 2004 it was reported that on the west coast of Denmark an offshore wind farm called Horns Rev 1 connected by an undersea cable experienced over-voltages (OV) as high as 2 p.u. (per unit) when the main-circuit breaker tripped at the on-land connection point and left the wind farm in isolated operation with the cable and the wind farm transformer.

In W. Wiechowski, J. C. Hygebjerg and P. Børre Eriksen,— Higher Frequency Performance of AC Cable Connections of Offshore☐. 7th int. Conf. on Large Scale Integration of Wind Power and on Transmission Networks for Offshore Wind Farms, pp. 211-217, 2008 it was reported the Danish transmission system operator, Energinet.dk, performed investigations of such overvoltage in connection with the planning of the new offshore wind farm Horns Rev 2. These investigations have shown that the overvoltage levels are influenced by many parameters, including operational characteristics of the wind turbine generator (WTG) prior to the disconnection, protection systems, control and the accuracy of the representation of the cable and the transformers in the relevant frequency range.

It is desirable to provide a method to handle overvoltage for wind turbines which are highly effective and easy to implement.

SUMMARY OF THE INVENTION

According to an embodiment of the present invention, a method of operating a wind turbine including a power generator, a machine side converter connected to the power generator, a line side converter connected to a power grid through power components, and a DC-link connected between the machine side converter and the line side converter is provided. The method monitors the power grid for overvoltage events. If an overvoltage event is detected, the following processes are carried out: active operation of the machine side converter and of the line side converter are disabled; an AC-load dump connected between the machine side converter and the power generator is enabled in order to dissipate power output from the power generator into the AC-load dump; it is waited for a waiting period; and active operation of the line side converter and the machine side converter are enabled if the overvoltage event ends during the waiting period.

According to one embodiment, disabling active operation of a converter means (or at least includes) that PWM (pulse width modulation) signals to the converter are inhibited. Vice versa, enabling active operation of a converter may include that the PWM signals to the converter are no longer inhibited.

Advantages of this embodiment are that major power components in the converter system remain unchanged in order to ensure short term over voltage ride through for the turbine. Furthermore, only minor software changes (regarding controlling software which controls the operation of the wind turbine) have to be done. Minor hardware changes such as sensors and wirings might be required. The method is very robust. Irrespective whether the overvoltage is symmetric or asymmetric in nature, ride through capability is always possible.

Typically, a grid voltage above 1.1 per unit (pu) is considered an overvoltage or voltage swell. However, nominal voltage range and overvoltage level changes from country to country. Small amount of over voltage may be handled by absorbing the reactive power by active switching processes of the machine side converter and line side converter (collectively known as power converters). But such absorbing of reactive power through the power converters may not be adequate for handling larger overvoltage.

According to an embodiment of the present invention, the term "overvoltage event" means the occurrence of an overvoltage. The overvoltage event may include small overvoltage of about 1.1 pu (per unit) or large overvoltage of about 2.0 pu or more. Even though it is mentioned that small overvoltage of 11 pu can be handled by the converters by absorbing reactive power, it is also possible that small overvoltage is handled according to the present invention. The overvoltage event may also include the occurrence of a concatenation of several successive overvoltage events.

According to an embodiment of the present invention, the duration of the waiting period is dynamically set depending on the overvoltage detected. For example, the duration of the waiting period may exponentially decrease with increasing overvoltage magnitude. Other relationships other than exponential relationships between overvoltage and the waiting time may be used.

According to an embodiment of the present invention, the method further includes: monitoring whether, due to the overvoltage event, the DC-link voltage exceeds a predetermined DC-link voltage limit (due to a rise of the DC-link voltage affected by the overvoltage event); if it is determined that the DC-link exceeds the predetermined DC-link voltage limit, waiting until the DC-link voltage falls below the predetermined DC-link voltage limit; and enabling active operation of the machine side converter and of the line side converter after the DC-link voltage falls below the predetermined DC-link voltage limit to a predetermined DC-link voltage range. The predetermined DC-link voltage limit is for example chosen based on grid requirements, generator requirements and/or converter design aspects. Waiting until the DC-link voltage falls below the predetermined DC-link voltage limit ensures that the line side converter is able to start active operation safely.

According to one embodiment the method further includes monitoring whether, due to the overvoltage event, the grid voltage exceeds a predetermined grid voltage limit; if it is determined that the grid voltage exceeds the predetermined grid voltage limit, waiting until the grid voltage falls below the predetermined grid voltage limit; and enabling active operation of the machine side converter and of the line side converter after the grid voltage falls below the predetermined grid voltage limit.

According to an embodiment of the present invention, the machine side converter is activated after the line side converter has been activated. The order of activating the machine side converter after the line side converter ensures that the activation processes of these converters are carried out with increased safety and smooth power transfer. According to an embodiment of the present invention, there is a small time gap between activating the machine side converter and activating the line side converter. The time gap helps to ensure that the operation of the line side converter has already been stabilized before activating the machine side converter, thereby further increasing the stability and smoothness of the process.

According to an embodiment of the present invention, after the end of the overvoltage event, the AC-load dump is deactivated and a DC-link load dump connected across the DC-link is activated, wherein power from the generator is dissipated into the DC-link load dump. The activation of the DC-link load dump may be optionally carried out (e.g. controlled by a duty cycle) to smoothen the power ramp up process from generator to grid. In this situation the DC-link voltage may already be within a pre-determined voltage limit.

According to an embodiment of the present invention, the active power output by the line side converter is ramped up after the DC-link load dump has been activated. This ramp up ensures a stable and smooth transition from an overvoltage operation mode to a normal operation mode of the wind turbine.

According to an embodiment of the present invention, the power dissipated into the DC-load dump is ramped down while active power output by the line side converter is ramped up simultaneously. The ramp up/down process ensures a smooth transition between an overvoltage mode and a normal operation mode of the wind turbine.

According to an embodiment of the present invention, a blade pitch out process and/or a turbine shut down process is/are carried out if the overvoltage event still remains after the waiting period. According to an embodiment of the present invention, the AC-load dump may be continuously enabled during the blade pitch out process/turbine shut down process, thereby ensuring a safe pitch out of the blade (s)/shut down process of the turbine.

According to an embodiment of the present invention, a system for controlling operation of a wind turbine comprising a power generator, a machine side converter connected to the power generator, a line side converter connected to a power grid, and a DC-link connected between the machine side converter and the line side converter is provided. The system comprises: a first monitoring unit configured to monitor the power grid for overvoltage events; an AC-load dump unit connected between the machine side converter and the power generator; and a controlling unit connected to the first monitoring unit and the AC-load dump unit, wherein the controlling unit is configured to control the following processes if an overvoltage event is detected by the first monitoring unit: disabling active operation of the machine side converter and of the line side converter, enabling the AC-load dump unit in order to dissipate power output by the power generator into the AC-load dump unit, waiting for a waiting period, and enabling active operation of the machine side converter and of the line side converter if the overvoltage event ends during the waiting period.

According to an embodiment of the present invention, the controlling unit is configured to dynamically set the waiting period depending on the amount of overvoltage detected.

According to an embodiment of the present invention, the system comprises a second monitoring unit connected to the controlling unit and configured to determine whether, due to the overvoltage event, the DC-link voltage exceeds a predetermined DC-link voltage limit, wherein the control unit is further configured to control the following processes: if it is determined by the second monitoring unit that the DC-link voltage exceeds the predetermined DC-link voltage limit, waiting until the DC-link voltage falls below the predetermined DC-link voltage limit; and enabling active operation of the line side converter only after the DC-link voltage falls below the predetermined DC-link voltage limit.

According to one embodiment, the system further comprises a second monitoring unit connected to the controlling unit and configured to determine whether, due to the overvoltage event, the grid voltage exceeds a predetermined grid voltage limit, wherein the control unit is further configured to control the following processes: if it is determined by the second monitoring unit that the grid voltage exceeds the predetermined grid voltage limit, waiting until the grid voltage falls below the predetermined grid voltage limit; and enabling active operation of the machine side converter and of the line side converter after the grid voltage falls below the predetermined grid voltage limit.

According to an embodiment of the present invention, the control unit is configured to activate the machine side converter after the line side converter has been activated.

According to an embodiment of the present invention, the system further comprises a DC-link load dump unit connected to the DC-link, wherein the control unit is configured to deactivate, after the end of the overvoltage event, the AC-load dump unit, and to activate the DC-link load dump unit in order to dissipate power into the DC-link load dump unit.

According to an embodiment of the present invention, the control unit is configured to ramp up the active power output by the line side converter after the DC-link load dump unit has been activated.

According to an embodiment of the present invention, the control unit is configured to ramp down the power dissipated into the DC-load dump unit while active power output by the line side converter is ramped up.

According to an embodiment of the present invention, the control unit is configured to control a blade pitch out process and/or a turbine shut down process if the overvoltage event remains after the waiting period.

According to an embodiment of the present invention, the load dump unit comprises at least one switch and at least one resistor which can be activated by the at least one switch.

Finally, the present invention provides a wind turbine comprising a system in accordance with any embodiment as described above.

According to an embodiment of the present invention, a wind turbine is provided comprising a system for controlling operation of the wind turbine according to any one of the previously mentioned embodiments.

DESCRIPTION

Figure 1:
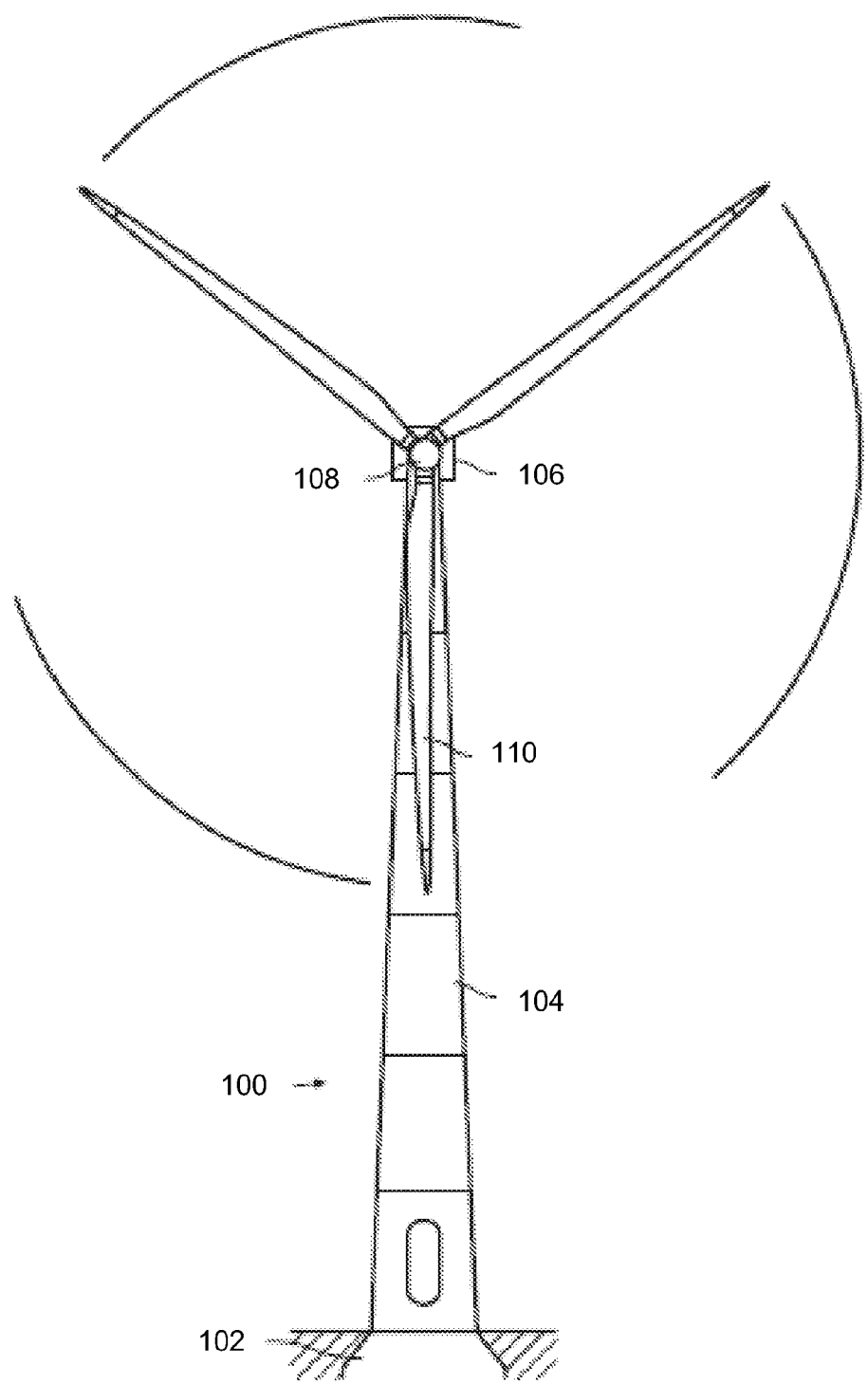
FIG. 1 shows a schematic drawing of a wind turbine according to an embodiment of the present invention.

FIG. 1 illustrates a common setup of a wind turbine 100 which may use the inventive method/system as described below. The wind turbine 100 is mounted on a base 102. The wind turbine 100 includes a tower 104 having a number of tower sections. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
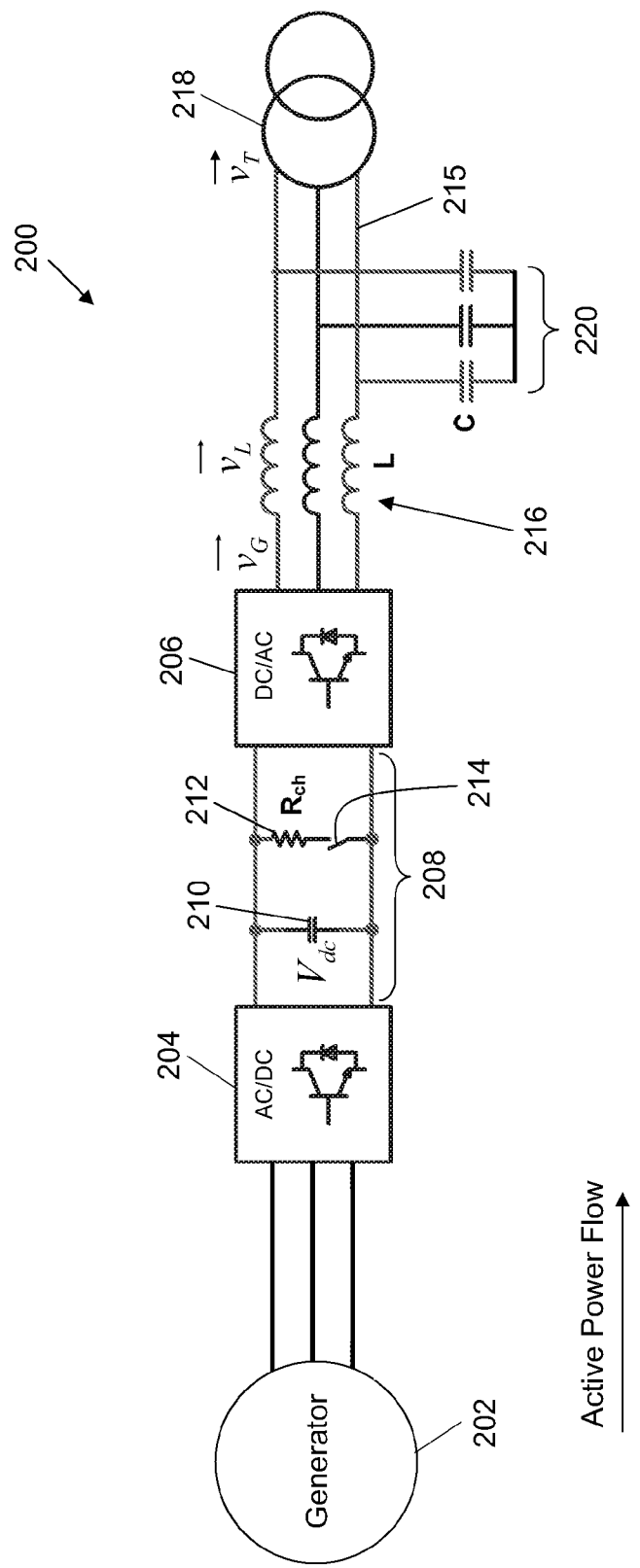
FIG. 2 shows a schematic drawing of a system used for operating a conventional wind turbine.

FIG. 2 shows a schematic drawing of an electrical system 200 of a wind turbine. The wind turbine comprises a generator 202, an AC/DC (generator or machine side) converter 204, an DC/AC (grid or line side) converter 206, and a DC-link 208 connected between the AC/DC converter 204 and the DC/AC converter 206. Output terminals of the generator 202 are connected to input terminals of the AC/DC converter 204. A first end of the DC-link 208 is connected to the output terminals of AC/DC converter 204, and the other end of the DC-link 208 is connected to input terminals of the DC/AC converter 206. The DC-link 208 comprises a DC-link capacitor 210 as well as a DC-link dump resistor 212. The DC-link load dump resistor 212 can be activated/deactivated (connected between two arms of the DC-link 208 or disconnected therefrom) via a switch 214. It should be noted that switches used according to the various embodiments, such as switch 214, may be power electronic switch. Output terminals of DC/AC converter 206 are connected via a power line 215 including inductors/chokes 216 to a grid transformer 218. A filter system 220 for filtering out switching harmonics is connected to the power line 215. The filter system may also contain a resonance damping branch (not shown) to avoid resonance phenomenon.

The electrical system 200 may further include an AC load dump (not shown) coupled to the phase lines between the generator 202 and the AC/DC converter 204, similarly as it is described below with reference to FIG. 7.

Figure 3:
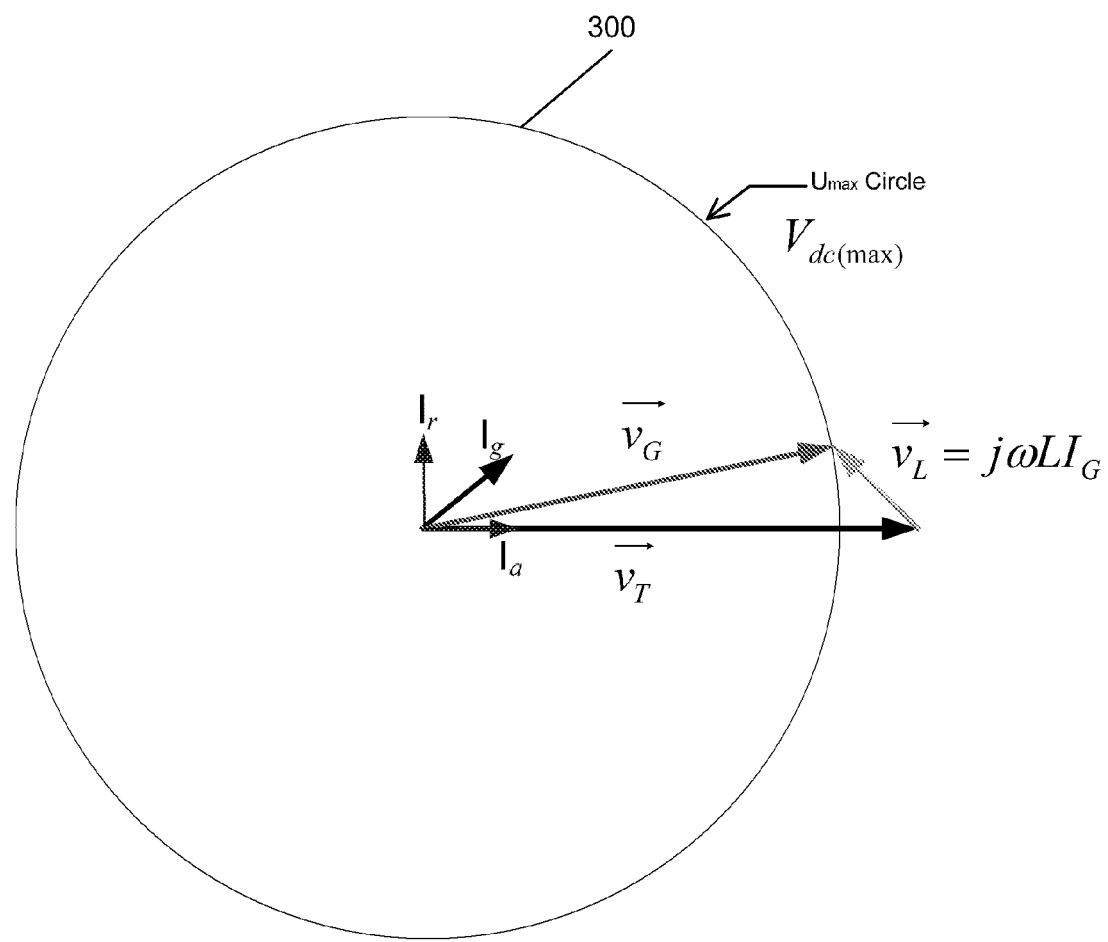
FIG. 3 shows a vector diagram illustrating how a power converter control of a WTG handles an overvoltage by absorbing reactive power for the system shown in FIG. 2.

In the normal condition, the active power flows as shown in the FIG. 2. That is, switch 214 is open and the LSC (line side converter) and MSC (machine side converter) converters are switching (i.e. they are in active operation). Depending the control algorithm being used and hardware ratings they can withstand a grid overvoltage e.g. 1.1-1.3 pu. One popular approach to withstand grid overvoltages is to absorb reactive power as shown in FIG. 3. However, there is a voltage $v_{T(max)}$ after which converter control can not handle the grid voltage anymore. At this voltage, the whole converter voltage and current capacities are used to absorb maximum reactive power.

In normal condition if the grid voltage is higher than what a line side converter can handle it may start charging the DC-link through the grid converter which acts as rectifier now. This may lead to unintended tripping of the converter system/wind turbine.

FIG. 3 shows the relationship between the voltages $v_G$, $v_L$ and $v_T$ which occur at positions of the power line 215 as indicated in FIG. 2. As can be observed from FIG. 3, in an overvoltage event, a grid transformer voltage $v_T$ is larger than a maximum voltage $v_G$ of the DC/AC converter 206 which is obtained through the maximum utilization of DC-link voltage $V_{dc}$ represented by the outer circumference of the circle 300 shown in FIG. 3. In order to balance this overvoltage (i.e. in order to ensure that $v_G = v_L + v_T$), the DC/AC converter 206 (line side converter) is operated such that a reactive power is absorbed leading to a grid current $I_g$ at output terminals of the DC/AC converter 206 comprising a reactive current component $I_r$ and a active current component $I_a$. The reactive current component $I_r$ and active current component $I_a$ of the grid current $I_g$ are chosen such that the voltage $v_L$ dropping across the inductors 216 ("grid choke voltage") is equal to the vector difference between the grid transformer voltage $v_T$ and the converter voltage $v_G$, as shown in FIG. 3. In the situation shown in FIG. 3, the grid current $I_g$ still comprises an active current component $I_a$.

Figure 4:
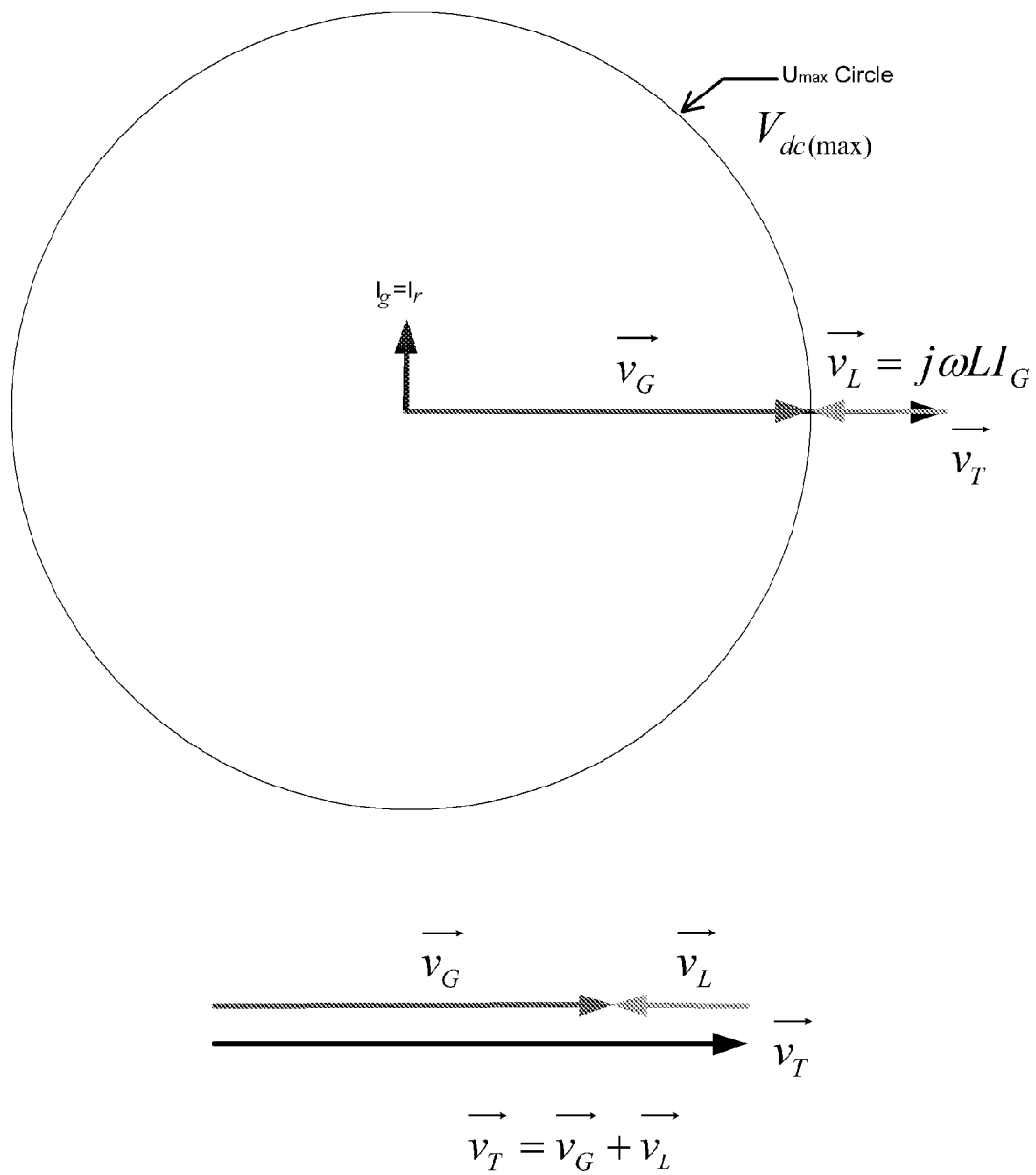
FIG. 4 shows a vector diagram illustrating how a power converter control of a WTG handles overvoltage by absorbing the maximum reactive power for the system shown in FIG. 2.

FIG. 4 shows an overvoltage scenario in which, compared to the scenario shown in FIG. 3, the grid transformer voltage $v_T$, is increased. The overvoltage scenario shown in FIG. 4 is the maximum grid transformer voltage $v_T$ that can be handled by the DC/AC converter 206 is still capable of balancing the voltages by absorbing reactive power. However, in order to balance the overvoltage in this case, the grid current $I_g$ injected at the output terminals of the DC/AC converter 206 only contains a reactive current component $I_r$, i.e. no active current component $I_a$.

Figure 5:
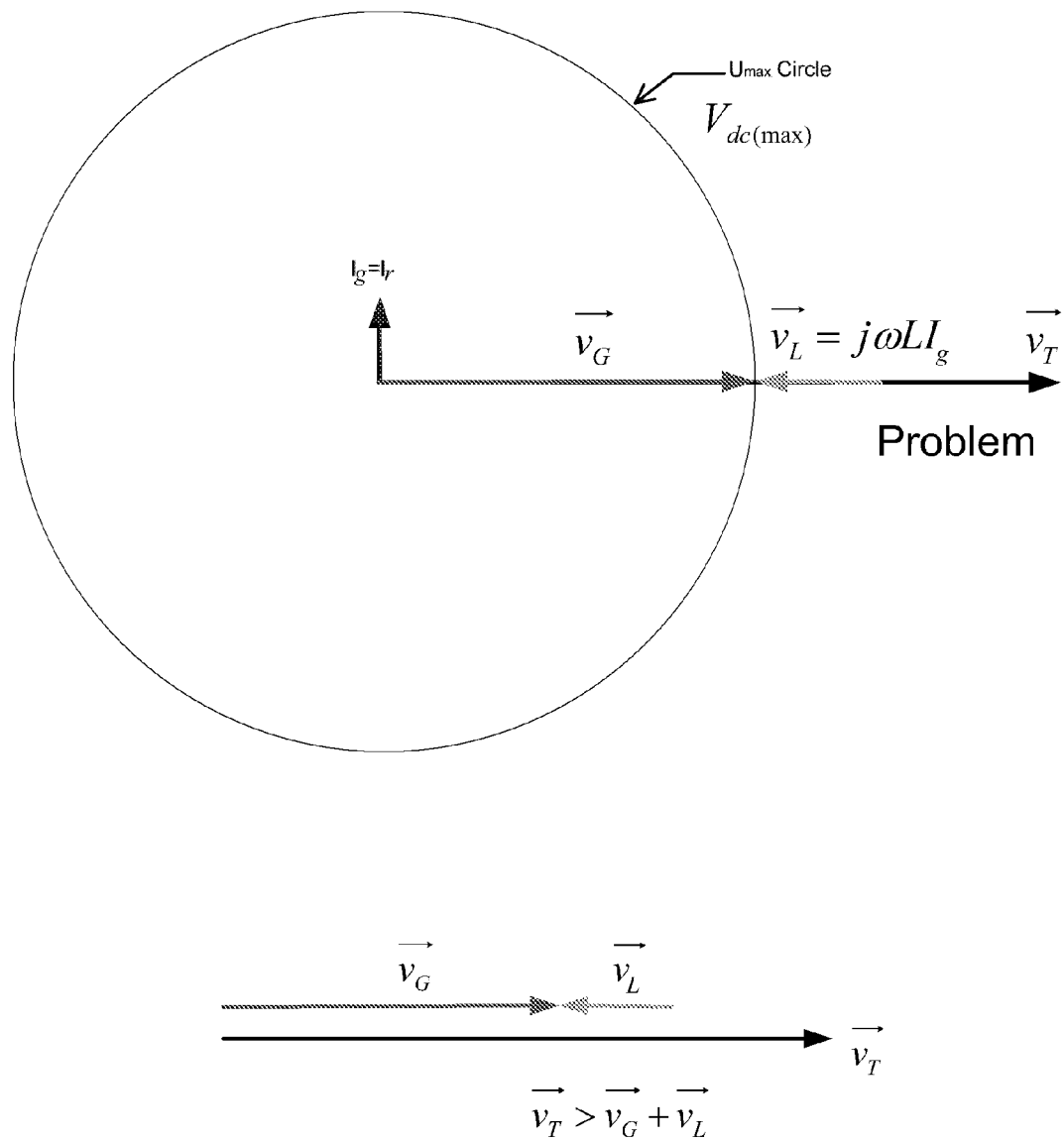
FIG. 5 shows a vector diagram of an overvoltage event which can not be handled even by absorbing maximum reactive power for the system shown in FIG. 2.

FIG. 5 shows an overvoltage scenario in which the overvoltage is so high that even the maximum grid current $I_g$ which can be output by the DC/AC converter 206 is not sufficient for balancing the overvoltage. As a result of this condition, active operation (active switching) of the DC/AC converter 206 is stopped, meaning that the DC/AC converter 206 acts as a passive rectifier after stopping active operation. As a consequence, the DC-link voltage $V_{dc}$ increases which may result in unintentional tripping of the wind turbine.

Embodiments of the present invention aim to at least solve the overvoltage scenario shown in FIG. 5, i.e. aim to provide a solution to keep the wind turbine connected to a power grid even if an overvoltage scenario as shown in FIG. 5 occurs. It should be noted that the embodiments of the present invention may also be used to handle overvoltage scenarios as shown in FIG. 3 and/or FIG. 4.

Figure 6:
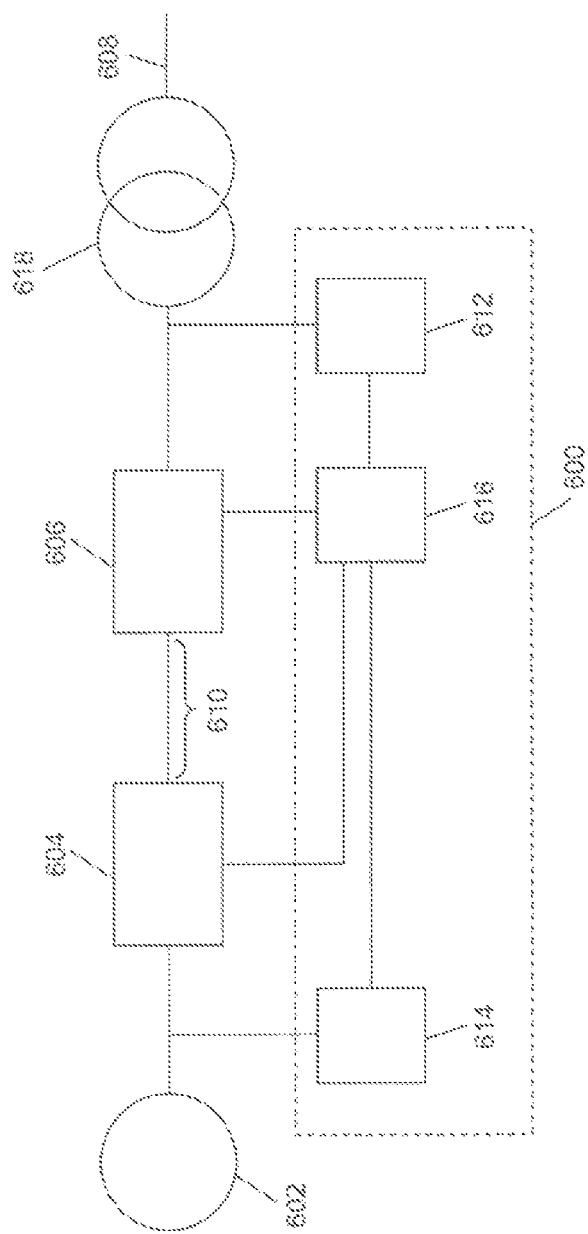
FIG. 6 shows a schematic drawing of a system of operating a wind turbine according to an embodiment of the present invention.

FIG. 6 shows a system 600 for controlling operation of a wind turbine according to an embodiment of the present invention. The system 600 is usable within a wind turbine comprising a power generator 602, a machine side converter 604 connected to the power generator 602, a line side converter 606 connected to a power grid 608 via a grid transformer 618, and a DC-link 610 connected between the machine side converter 604 and the line side converter 606. The system 600 comprises: a first monitoring unit 612 configured to monitor the power grid 608 for overvoltage events; an AC-load dump unit 614 connected between the machine side converter 604 and the power generator 602; and a controlling unit 616 connected to the first monitoring unit, the machine side converter 604, the line side converter 606, and the AC-load dump unit 614, wherein the controlling unit 616 is configured to control the following processes if an overvoltage event is detected by the first monitoring unit 612: disabling active operation of the machine side converter 604 and of the line side converter 606; enabling the AC-load dump unit 614 in order to dissipate power output from the power generator 602 into the AC-load dump unit; waiting for a waiting period; and enabling active operation of the machine side converter 604 and of the line side converter 608 if the overvoltage event ends during the waiting period. If the overvoltage event persists after the waiting period, the turbine may be shut down or the blades of the turbine are pitched out.

According to an embodiment, the controlling unit 616 may also carry out the following two tasks: (1) It controls the operation of the DC-link load dump (e.g. controls switch 214) and (2) it controls the breakers and contactors in the converter system (not shown).

It should be noted that the first monitoring unit 612 may for example be realized by a processor executing a corresponding software algorithm.

It should be noted that the controlling unit 616 may only disable the active operation of the converters if the detected overvoltage event is overvoltage which cannot be handled by the line side converter by absorbing reactive power (i.e. situation shown in FIG. 5). Alternatively, the controlling unit 616 may disable the active operation of the converters as long as an overvoltage event of any overvoltage level is detected.

Figure 8:
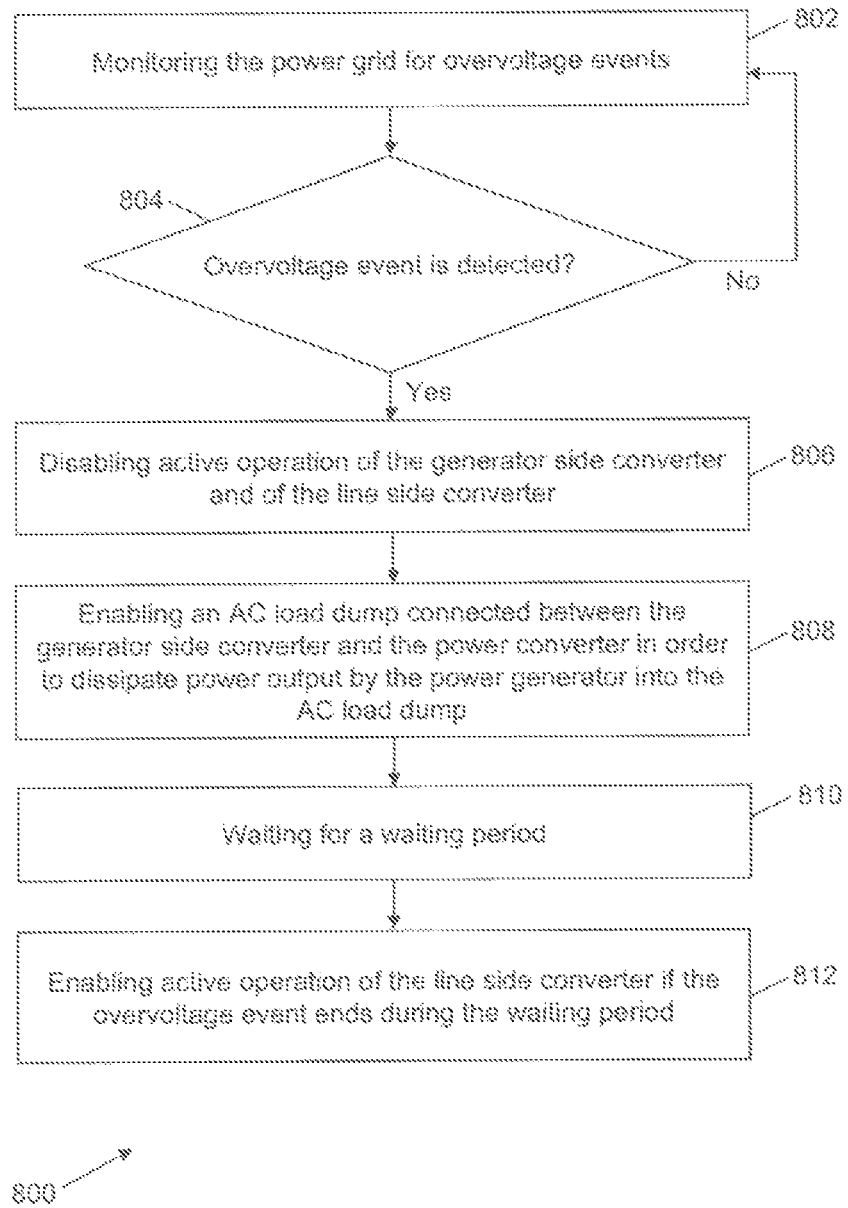
FIG. 8 shows a flowchart of a method of operating a wind turbine according to an embodiment of the present invention.

FIG. 8 shows a flow chart of a method of operating a wind turbine comprising a system as indicated in FIG. 6. At 802, a power grid is monitored for overvoltage events. It is determined at 804 whether an overvoltage event has been detected. If no overvoltage event has been detected, the flow returns to 802. If an overvoltage event has been detected, active operation of the machine side converter and of the line side converter are disabled at 806. At 808, an AC-load dump connected between the machine side converter and the power generator is enabled in order to dissipate power output from the power generator into the AC-load dump. At 810, it is waited for a waiting period. At 812, active operation of the line side converter is enabled if the overvoltage event ends during the waiting period.

Figure 7:
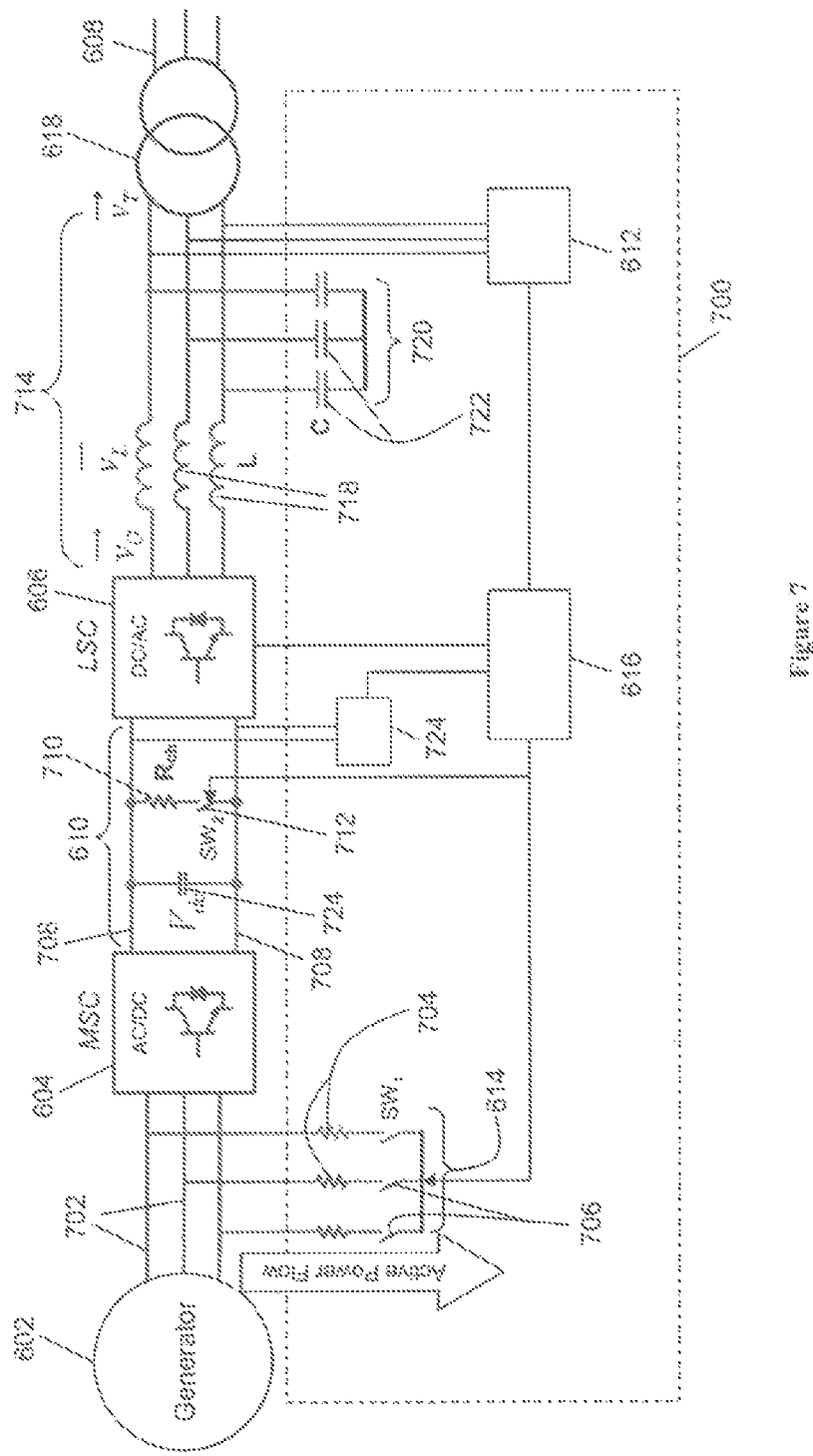
FIG. 7 shows a schematic drawing of a system of operating a wind turbine according to an embodiment of the present invention.

FIG. 7 shows an example of a more detailed realization of the system 600 as shown in FIG. 6. A system 700 for controlling operation of a wind turbine has substantially the same architecture as the system 600 shown in FIG. 6. Thus, only the additional features of the wind turbine and the controlling system 700 not shown in FIG. 6 will be explained.

The wind turbine is a three-phase wind turbine. To each phase 702 connecting the power generator 602 to the AC/DC converter 604, a resistor 704 is coupled, respectively. A first terminal of each resistor 704 is coupled to its corresponding phase 702. A second terminal of each resistor 704 is connectable via a corresponding switch 706 to a common coupling point. As a result, the second terminals of the resistor 704 can be connected with each other if all corresponding switches 706 are activated. The sequence of connections between resistor and switch may change, and other arrangements are also possible. The three resistors 704 coupled to the 3-phase output of the generator 602 collectively forms a 3-phase AC load dump.

The DC-link 610 has two arms 708 which are connected with each other via a DC-link capacitor 724 (or a capacitor bank) and which can also be connected with each other via a resistor 710 (or a resistor bank). In order to connect the DC-link arms 708 with each other via the resistor 710, a switch 712 has to be activated. The combination of DC-link resistor 710 and switch 712 forms a DC-link load dump. The combination of the resistors 704 and the switch 706 forms the AC-load dump. The AC load dump switches 706 as well as the DC load dump switch 712 are controlled by the controlling unit 616. The DC/AC converter 606 is connected via a power line 714 to the power grid 608. Each of the three phases of the power line 714 comprises an inductor 718. A filter system 720 comprising capacitor elements 722 is also connected to the power line 714 in order to filter switching harmonics. A resonance filter branch may also be included in parallel to the capacitor bank to dampen the resonance phenomenon.

The system 700 works as follows: the first monitoring unit 612 monitors the power grid for overvoltages. As soon as the first monitoring unit 612 detects an overvoltage event as shown in FIG. 5, i.e. as soon as the DC/AC converter 606 is no longer able to handle the overvoltage occurring on the power grid 608 alone, then the following steps are carried out: The first monitoring unit 612 sends a corresponding signal to the controlling unit 616 informing that such an overvoltage event has been detected. The controlling unit 616 disables active operation of the AC/DC converter 604 and the DC/AC converter 606 by sending corresponding disabling signals to the converters 604, 606. Disabling active operation means that the converters 604, 606 do not perform any active switching i.e. no PWM signals are provided. In addition, the controlling unit 616 sends an activation command to the AC-load dump unit 614, thereby activating the switches 706 (i.e. the switches are closed). As a result of these commands, the active power output by the power generator 602 is dissipated into the AC-load dump 614 (three phase resistor bank) in order to protect the AC/DC converter 604, the DC/AC converter 606, DC-link capacitor bank and other related hardware components. Since the AC/DC converter 604 and the DC/AC converter 606 do not perform any active switching, these converters respectively act as passive rectifiers. As a result, the DC-link voltage $V_{dc}$ increases corresponding to the grid overvoltage. Since the DC/AC converter 606 is working as a rectifier, for a grid voltage $v_G$, the $V_{dc}$ can be determined as $\sqrt{2}*v_G$ i.e. typically, the DC-link voltage is proportional to the grid voltage. Active operation of a converter can be done up to a maximum DC link voltage, $V_{dc1}$. This maximum DC link voltage $V_{dc1}$ is usually specified by the converter supplier/manufacturer. However, a converter can tolerate a sufficiently higher DC-link voltage $V_{dc2}$ ($V_{dc2}>V_{dc1}$) when it is not switching. It can be easily understood that $V_{dc1}$ is the maximum DC-link voltage above which the active operation of converter is not possible. When the DC link voltage is above the maximum DC link voltage i.e. when $V_{dc}>V_{dc1}$, the DC/AC converter 606 works in passive/rectifier mode. Therefore, after having disabled active operation of the AC/DC converter 604 and of the DC/AC converter 606, and after the first monitoring unit 612 has determined that the overvoltage event has ended, a second monitoring unit 724 monitors the DC-link voltage $V_{dc}$. As soon as the DC-link voltage has returned to and falls below the maximum DC-link voltage $V_{dc1}$ (which allow active operation of the AC/DC converter 606), a corresponding signal is sent from the second monitoring unit 724 to the controlling unit 616. The DC load dump resistor 710 might be activated by closing the switch 712 to help to reduce the DC-link voltage to normal range after the overvoltage event (i.e. when grid voltage returns to nominal range). As soon as the controlling unit 616 receives this signal, it enables active operation of the DC/AC converter 606 in order to prepare it for delivering power to the power grid 608. Before enabling active operation of the DC/AC converter 606, the DC-link voltage may be regulated to a DC-link reference voltage. Then, the controlling unit 616 enables active operation of the AC/DC converters 604. There may be a time gap between enabling active operation of the DC/AC converter 606 and the AC/DC converter 604. Then, the controlling unit 616 deactivates the switches 706 and controls the switching of the switch 712. The switch 712 is normally controlled using PWM signals. Activating the switch 712 signifies that all the power coming from the machine side converter goes into the resistor 716 and no power goes to the grid 608. The duty ratio of the PWM signal controlling the switch 712 depends on the power from the machine side converter and the power rating of the hardware components. Subsequently when the power from the line side converter to the grid is ramped up as per the grid/system requirements, the power going into the resistor 716 is simultaneously ramped down eventually to zero. This processes helps to avoid current/voltage peaks in the wind turbine.

It should be noted that the closing of switch 712, or, in other words, the activation of the DC load dump, is optional and may be optionally carried out for smoothing the power transfer process.

Furthermore, it should be noted that alternatively to the DC-link voltage $V_{dc}$, the grid voltage $V_G$ may be monitored and as soon as the grid voltage falls below a maximum grid voltage, a corresponding signal is sent to the controlling unit 616.

Should the overvoltage event remain after the waiting period, the wind turbine blades may be pitched out or eventually the wind turbine may be shut down. During these processes, the switches 706 may remain activated in order to better protect the converters 604, 606, their DC-link and related hardware.

Figure 10:
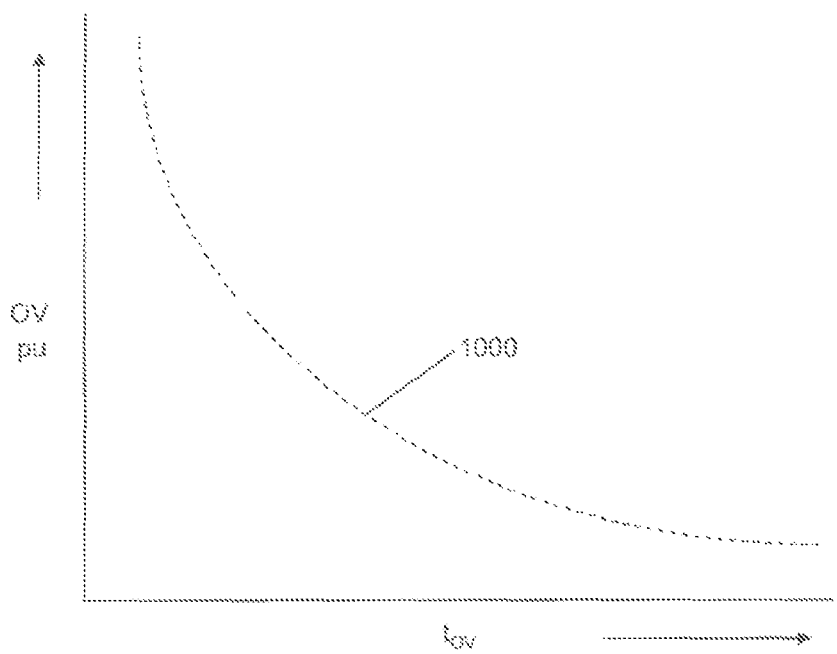
FIG. 10 shows a possible relationship between a magnitude of an overvoltage and a waiting time usable within the method/system of operating a wind turbine according to an embodiment of the present invention.

The waiting period may depend on the kind of overvoltage detected, specifically on the magnitude of the overvoltage. In FIG. 10, an exemplary relationship between waiting time and the magnitude of the detected overvoltage is given. It should be noted that also other kinds of relationships between the waiting time and the detected overvoltage may be used.

In the following description, further aspects and embodiments of the present invention will be explained.

Figure 9:
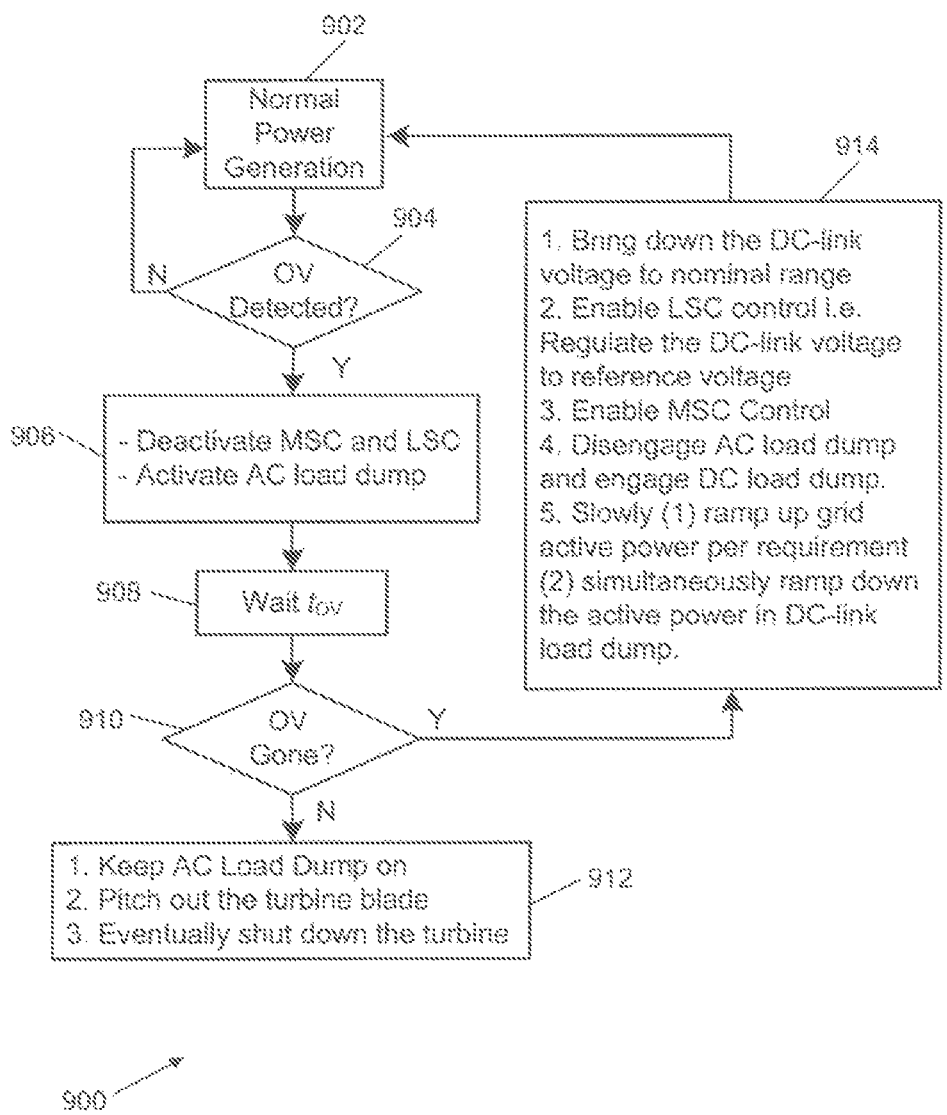
FIG. 9 shows a flow chart of a method of operating a wind turbine according to an embodiment of the present invention.

According to an embodiment of the present invention, the following method is carried out which will be explained with reference to FIG. 9:

Initially, at 902, the line side converter and the machine side converter are in normal power generation mode. At 904, it is determined whether the grid transformer voltage is larger than $v_{T(max)}$ (maximum allowable grid transformer voltage).

If the grid transformer voltage is larger than $v_{T(max)}$, then active switching of the line side converter and of the generator side converter are inhibited at 906. Further, an AC load dump is activated. In addition, a DC load dump may be activated for a short time if required (which depends on the kind/amount of overvoltage detected). At 908, it is waited for a waiting time toy. The waiting time toy may depend on the magnitude of the overvoltage. For example, if the overvoltage is for 1.6 pu, then the waiting time may be 40 ms. It is possible to reconfigure $t_{OV}$, if necessary (for example if the grid code requirements change). At 910, it is determined whether the overvoltage has already diminished/reduced. If the overvoltage has gone, the following processes are carried out at 914:

The DC-link voltage is brought down to a nominal range. This will allow the converters to be enabled for the power transfer.

The active operation of the line side converter 606 is enabled. The DC-link voltage is regulated to a reference voltage. It should be noted that once DC-link is regulated, the LSC is ready to transfer power through current/power control.

The active operation of the machine side converter 604 is enabled.

The AC load dump is disengaged, and the DC load dump is engaged.

The grid active power is slowly ramped up per the grid requirement, and simultaneously the DC-load dump is slowly ramped down. The ramping down of the DC load dump can be done by controlling the PWM signal through the switch 712.

On the other hand, if after the waiting time $t_{OV}$ the grid voltage does not recover, the following processes may be carried out at 912:

The AC Load Dump is kept on to keep dumping active power.

The wind turbine blades are pitched out.

Eventually the wind turbine shuts down.

As has become apparent, embodiments of the present invention enable effective use of the converter hardware capability when the converter does not switch, namely to let the DC-link voltage increase.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a wind turbine comprising a power generator, a machine-side converter connected to the power generator, a line-side converter connected to a power grid through associated power components, and a DC-link connected between the machine-side converter and the line-side converter, the method comprising:
monitoring the power grid for overvoltage events;
upon detecting an overvoltage event:
disabling active operation of the machine-side converter and the line-side converter;
enabling an AC load dump connected between the machine side converter and the power generator in order to dissipate power output from the power generator into the AC load dump;
waiting for a waiting period; and enabling active operation of the line-side converter and the machine converter when the overvoltage event ends within the waiting period.

2. The method according to claim 1, wherein the duration of the waiting period is dynamically set depending on the overvoltage detected.

3. The method according to claim 1, further comprising:
monitoring whether, due to the overvoltage event, a DC-link voltage exceeds a predetermined DC-link voltage limit;
upon determining that the DC-link voltage exceeds the predetermined DC-link voltage limit, waiting until the DC-link voltage decreases to less than the predetermined DC-link voltage limit; and
enabling active operation of the machine-side converter and the line-side converter after the DC-link voltage decreases to within a predetermined DC-link voltage range that is less than the predetermined DC-link voltage limit.

4. The method according to claim 1, further comprising:
monitoring whether, due to the overvoltage event, a grid voltage exceeds a predetermined grid voltage limit;
upon determining that the grid voltage exceeds the predetermined grid voltage limit, waiting until the grid voltage decreases to less than the predetermined grid voltage limit; and
enabling active operation of the machine-side converter and of the line-side converter after the grid voltage decreases to less than the predetermined grid voltage limit.

5. The method according to claim 1, wherein enabling active operation of the machine-side converter occurs after enabling active operation of the line-side converter.

6. The method according to claim 1, further comprising: after the end of the overvoltage event, deactivating the AC load dump and activating a DC-link load dump connected to the DC-link, wherein power from the power generator is dissipated into the DC-link load dump.

7. The method according to claim 6, further comprising:
after activating the DC-link load dump, ramping up active power output by the line-side converter.

8. The method according to claim 7, further comprising:
during the ramping up of the active power output by the line-side converter, ramping down the power dissipated into the DC-link load dump.

9. The method according to claim 1, further comprising:
upon determining the overvoltage event remains after completion of the waiting period, performing at least one of:
pitching out one or more blades of the wind turbine, and
shutting down the wind turbine.

10. A system for controlling operation of a wind turbine comprising a power generator, a machine-side converter connected to the power generator, a line-side converter connected to a power grid, and a DC-link connected between the machine-side converter and the line-side converter, the system comprising:
a first monitoring unit configured to monitor the power grid for overvoltage events;
an AC load dump unit connected between the machine-side converter and the power generator; and
a controlling unit connected to the first monitoring unit and the AC load dump unit and configured to, upon detection of an overvoltage event by the first monitoring unit:
disable active operation of the machine-side converter and of the line-side converter,
enable the AC load dump unit in order to dissipate power output from the power generator into the AC load dump unit,
wait for a waiting period, and
enable active operation of the machine-side converter and of the line-side converter when the overvoltage event ends within the waiting period.

11. The system according to claim 10, wherein the controlling unit is further configured to dynamically set the waiting period depending on the overvoltage detected.

12. The system according to claim 10, further comprising:
a second monitoring unit connected to the controlling unit and configured to determine whether, due to the overvoltage event, a DC-link voltage exceeds a predetermined DC-link voltage limit,
wherein the controlling unit is further configured to:
upon determining by the second monitoring unit that the DC-link voltage exceeds the predetermined DC-link voltage limit, wait until the DC-link voltage decreases to less than the predetermined DC-link voltage limit, and
enable active operation of the machine-side converter and of the line-side converter after the DC-link voltage decreases to less than the predetermined DC-link voltage limit.

13. The system according to claim 10, further comprising:
a second monitoring unit connected to the controlling unit and configured to determine whether, due to the overvoltage event, a grid voltage exceeds a predetermined grid voltage limit,
wherein the controlling unit is further configured to:
upon determining by the second monitoring unit that the grid voltage exceeds the predetermined grid voltage limit, waiting until the grid voltage decreases to less than the predetermined grid voltage limit, and
enable active operation of the machine-side converter and the line-side converter after the grid voltage decreases to less than the predetermined grid voltage limit.

14. The system according to claim 10, wherein the controlling unit is further configured to enable active operation of the machine-side converter after enabling active operation of the line-side converter.

15. The system according to claim 10, further comprising:
a DC-link load dump unit connected to the DC-link,
wherein the controlling unit is further configured to:
deactivate, after the end of the overvoltage event, the AC load dump unit, and
activate the DC-link load dump unit in order to dissipate the power from the power generator into the DC-link load dump unit.

16. The system according to claim 15, wherein the controlling unit is further configured to:
after activating the DC-link load dump unit, ramp up active power output by the line-side converter.

17. The system according to claim 16, wherein the controlling unit is further configured to:
during ramping up of the active power output by the line-side converter, ramp down the power dissipated into the DC-link load dump unit.

18. The system according to claim 10, wherein the controlling unit is further configured to:
upon determining the overvoltage event remains after completion of the waiting period, perform at least one of:
pitching out one or more blades of the wind turbine; and
shutting down the wind turbine.

19. The system according to claim 10, wherein at least one of the AC load dump unit and a DC load dump unit comprises:
   at least one switch, and
   at least one resistor which can be activated by the at least one switch.

20. A wind turbine operatively connected with a power grid, the wind turbine comprising:
   a power generator;
   a machine-side converter connected with the power generator;
   a line-side converter connected with the power grid;
   a DC-link connected between the machine-side and line-side converters;
   a first monitoring unit configured to monitor the power grid for overvoltage events;
   an AC load dump unit connected between the machine-side converter and the power generator; and
   a control unit connected with the first monitoring unit and the AC load dump unit and configured to, upon detection of an overvoltage event by the first monitoring unit:
   disable active operation of the machine-side converter and the line-side converter,
   enable the AC load dump unit in order to dissipate power output from the power generator into the AC load dump unit,
   wait for a waiting period, and
   enable active operation of the machine-side converter and the line-side converter when the overvoltage event ends within the waiting period.

* * * * *